United States Patent [19]

Saka et al.

[11] Patent Number: 5,359,457
[45] Date of Patent: Oct. 25, 1994

[54] WIDE-ANGLE ZOOM LENS SYSTEM

[75] Inventors: Manami Saka, Kyoto; Katsuhiro Takamoto, Nagaokakyo, both of Japan

[73] Assignee: Minolta Camera Co., Ltd., Osaka, Japan

[21] Appl. No.: 947,788

[22] Filed: Sep. 18, 1992

[30] Foreign Application Priority Data

Oct. 3, 1991 [JP] Japan .................. 3-256569

[51] Int. Cl.$^5$ ............................. G02B 15/14
[52] U.S. Cl. .......................... 359/684; 359/687
[58] Field of Search ................... 359/684, 687

[56] References Cited

U.S. PATENT DOCUMENTS

| | | | |
|---|---|---|---|
| 4,200,358 | 4/1980 | Tsuji et al. | 359/683 |
| 4,802,747 | 2/1989 | Horiuchi | 359/687 |
| 4,818,083 | 4/1989 | Mihara | 359/687 |
| 4,859,042 | 8/1989 | Tanaka | 359/684 |
| 4,925,280 | 5/1990 | Hashimoto | 359/691 |
| 5,009,492 | 4/1991 | Hamano | 359/684 |
| 5,080,473 | 1/1992 | Ishii | 359/654 |
| 5,100,223 | 3/1992 | Ono et al. | 359/683 |
| 5,172,273 | 12/1992 | Yamanashi | 359/684 |
| 5,179,472 | 1/1993 | Ohno et al. | 359/687 |
| 5,189,558 | 2/1993 | Ishii et al. | 359/687 |
| 5,221,994 | 6/1993 | Nishio | 359/687 |
| 5,231,540 | 7/1993 | Shibata | 359/687 |

FOREIGN PATENT DOCUMENTS

| | | |
|---|---|---|
| 62-24213 | 2/1987 | Japan . |
| 62-153913 | 7/1987 | Japan . |
| 62-178917 | 8/1987 | Japan . |
| 63-29718 | 2/1988 | Japan . |
| 63-29719 | 2/1988 | Japan . |
| 64-68709 | 3/1989 | Japan . |
| 2-12118 | 1/1990 | Japan . |
| 2-39011 | 2/1990 | Japan . |
| 2-53017 | 2/1990 | Japan . |
| 2-55308 | 2/1990 | Japan . |
| 3-180809 | 8/1991 | Japan . |

*Primary Examiner*—Edward K. Look
*Assistant Examiner*—Michael S. Lee
*Attorney, Agent, or Firm*—Price, Gess & Ubell

[57] ABSTRACT

A wide-angle zoom lens system comprises, from the object side to the image side, a first positive lens unit being stationary on an optical axis during a zooming operation, a second negative lens unit shifting along the optical axis during the zooming operation, a third positive lens unit being stationary on the optical axis during the zooming operation, and a fourth positive lens unit shifting along the optical axis during the zooming operation, wherein the refractive power of the first and second lens units fulfills the predetermined conditions.

11 Claims, 4 Drawing Sheets

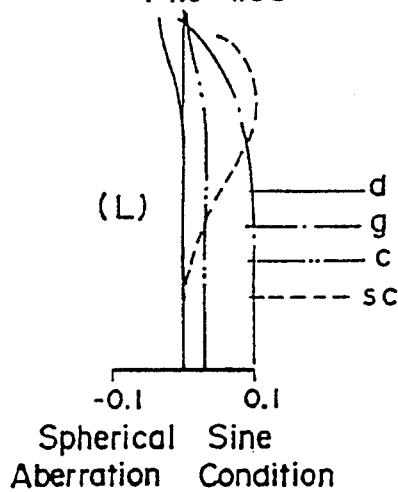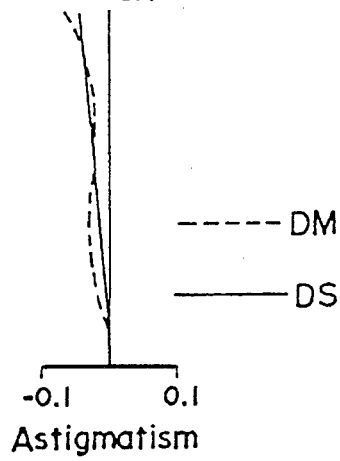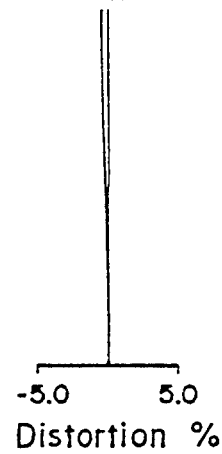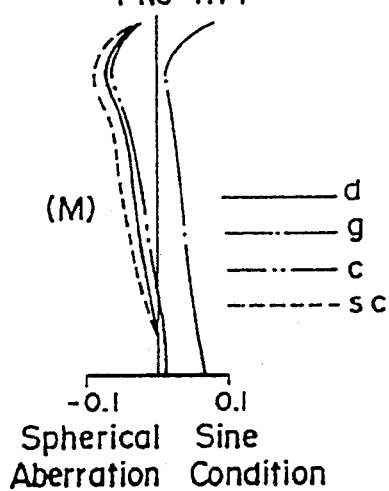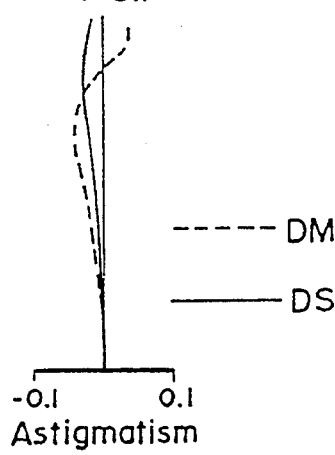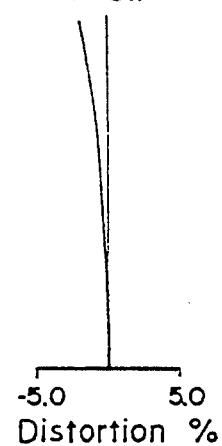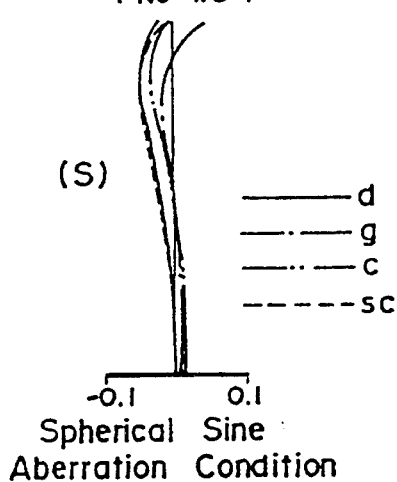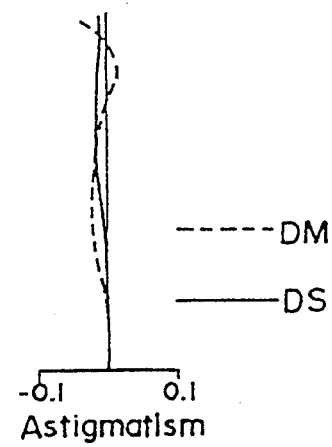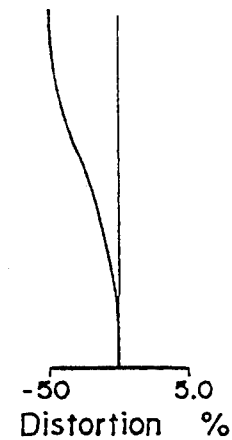

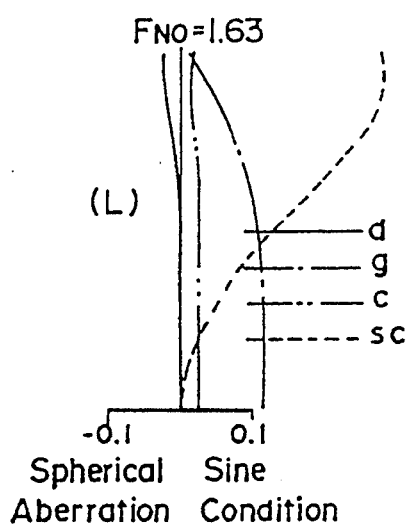
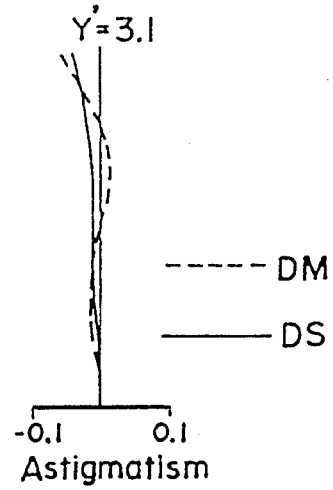
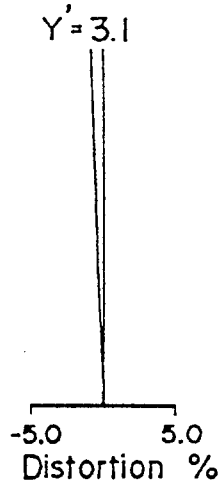
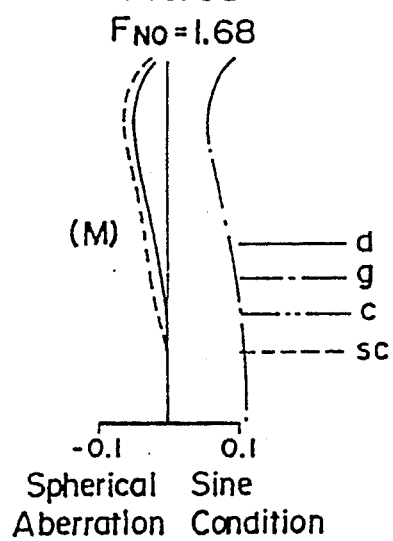
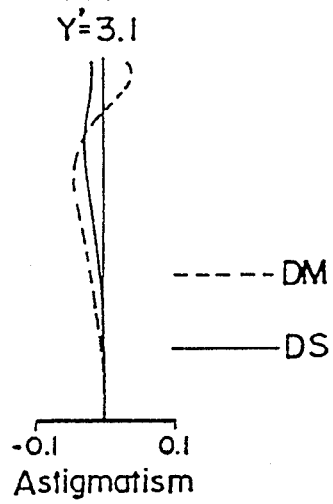
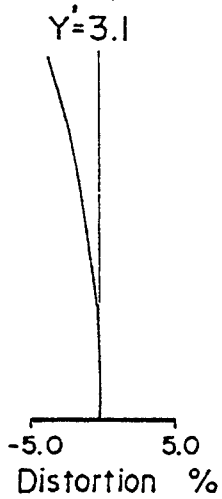
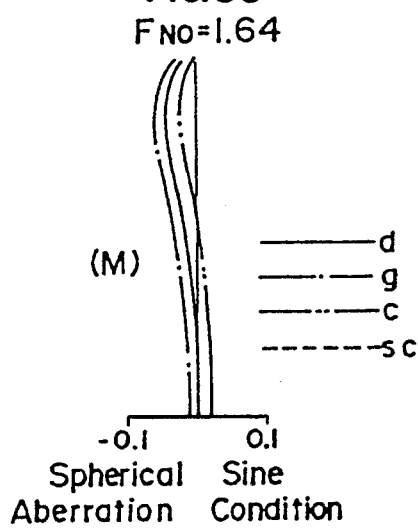
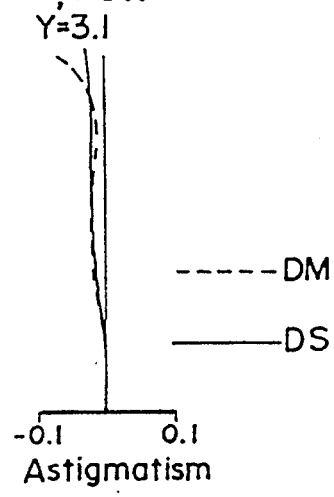
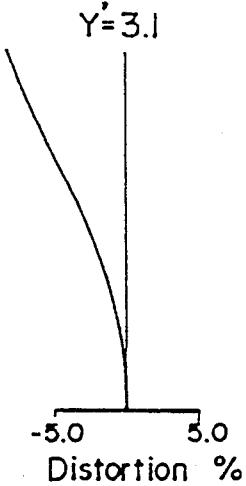

WIDE-ANGLE ZOOM LENS SYSTEM

BACKGROUND OF THE INVENTION

1. Field of the Invention

The present invention relates to a wide-angle zoom lens system practicable for a small camera such as a video camera.

2. Description of the Prior Art

Recently, a tape deck is manufactured small in size, and the integrated rate of an electronic circuit has been improved. And a camera body of a video camera and such is manufactured extremely small in size and costs are remarkably low. However, concerning a photographing lens which is indispensable to a camera, its relative value to a camera body is increasing in weight, volume and cost every year, although its absolute value is being improved. Therefore, a photographing lens is very much required to be manufactured smaller in size and to be lowered in its cost.

In the view of a camera user, an improvement in specifics of a photographing lens, such as a wide angle, a high zooming ratio, and a large aperture, is required as well as in its size and cost. As shown in FIG. 1(A), standard specifics of a photographing lens for a video camera at present are: about $2\omega=50°$ of an angle of view at the wide-angle end ($\omega$ denotes a half angle of view); $6\times$ in a zooming ratio; about 1.4–1.8 of an open f-number. In order to meet the above requirements of an improvement of a large-aperture lens and a high-zoom lens, a zoom lens whose open f-number is about 1.2 or whose zooming ratio is heightened to, for example, 8, 10, 12 or 16 by lengthening the focal length on the telephoto side is provided popularly.

However, to meet the above requirement of an improvement of a wide-angle lens, no zoom lens which includes an angle of view, of about $2\omega=60°$ (very much effective in indoor photographing and such), is generally proposed at all. Telephoto effect can be achieved in a camera body by picture image processing such as digital zooming, while wide-angle effect cannot be achieved by picture image processing in a camera body. Therefore, there is a strong request for early supply of a lens which meets the above requirement of an improvement of a wide-angle lens. The reason why no zoom lens capable of covering a wide angle is provided in spite of the request is described hereinafter.

It is comparatively easy to heighten a zooming ratio of a standard lens whose specifics are $2\omega=50°$ of an angle of view, $6\times$ in a zooming ratio and 1.4–1.8 of an open f-number as described above, by lengthening the focal length on the telephoto side, because even when the focal length is slightly lengthened, the diameter or the weight of a front lens of a lens system is influenced little owing to its small angle of view at the telephoto side. Practically, a zoom lens whose angle of view at the wide-angle side end is $2\omega=50°$, whose zooming ratio is $8\times$ and whose f-number is 1.7 is provided without being too big in size or increasing the number of lens elements, compared with a zoom lens whose zooming ratio is $6\times$.

On the other hand, it is very much difficult to make the zooming ratio large by lengthening the focal length on the wide angle side. Its reasons are described as follows.

i) On the wide angle side, an angle of view is large. Therefore, the diameter of the front lens has to be considerably large so as to prevent a lack of illumination caused by vignetting of off-axial light rays at the front lens. When the diameter of the front lens is lengthened, the weight of the lens system is excessively increased, because the ratio of the front lens weight to the lens system weight is extremely high.

ii) On the wide angle side, the off-axial light rays are incident at a considerable angle. Consequently, off-axial aberration such as distortion and curvature of field is large, and the number of lens elements has to be increased a lot so as to correct the aberration.

Now, few lenses covering a wide angle about $2\omega=60°$ are proposed. In the U.S. Pat. No. 4,200,358, as shown in FIG. 1(B), a zoom lens whose angle of view is $2\omega=56°$, whose open f-number is 1.4 and whose zooming ratio is $9.5\times$ is disclosed. In this case, though the angle of view is widened by only 6° from 50°, the diameter of a front lens obviously becomes large and the number of lens elements of the front lens is increased. In the Laid-Open Patent Application No. Sho 62-153913, as shown in FIG. 1(C), a zoom lens whose angle of view is $2\omega=83°$ and whose zooming ratio is $8\times$ is disclosed, although it is not for general use. For general use, an angle of view is not needed to be widened so much, but the degree of increase in number of front lens elements and in length of the diameter of the front lens show how difficult it is to make an angle of view wide. Thus, widening an angle of view more than $2\omega=50°$ is extremely difficult. So far, the problems of the large size and cost-up have not been solved. In a common video camera for general use, what is given priority is a request for a decrease in size and cost. As a result, such a wide-angle zoom lens as described above has never been used generally. In a field of a single lens reflex camera, a few wide-angle zoom lenses whose angle of view is about $2\omega=60°$ are proposed, but it is impossible to modify them so as to apply to a video camera.

SUMMARY OF THE INVENTION

An object of the present invention is to provide a zoom lens which meets the above described request for a widening of an angle of view, whose angle of view is more than $2\omega=60°$, and which is almost as small as a $6\times$ zoom lens having standard specifics.

BRIEF DESCRIPTION OF THE DRAWINGS

FIGS. 4A–4I are illustrations of aberration of the first embodiment of the present invention, wherein (A) shows aberration at the telephoto end; (B) at the middle of the focal length; and (C) at the wide angle end.

FIG. 5A–FIG. 5I are illustrations of aberration of the second embodiment of the present invention, wherein (A) shows aberration at the telephoto end; (B) at the middle of the focal length; and (C) at the wide angle end.

DETAILED DESCRIPTION OF THE PREFERRED EMBODIMENT

Figure 1:
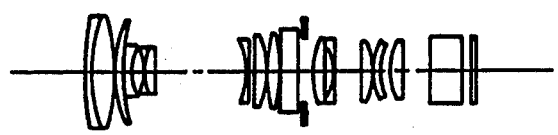
FIGS. 1A–FIG. 1C are sectional views of zoom lenses of the prior arts, wherein (A) shows a zoom lens whose zooming ratio is $6\times$ and f-number is 1.6; (B) shows a zoom lens whose angle of view is little bit wide (at the wide angle end, $2\omega=56°$), zooming ratio is $9.5\times$, and f-number is 1.4; and (c) shows a zoom lens whose angle of view is wide (at the wide angle end, $2\omega=83°$), zooming ratio is $8\times$, and f-number is 1.4.
Figure 1:
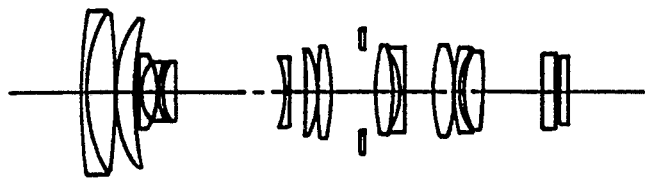
Figure 1:
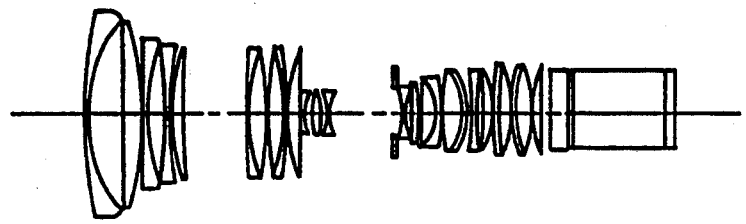
Figure 2:
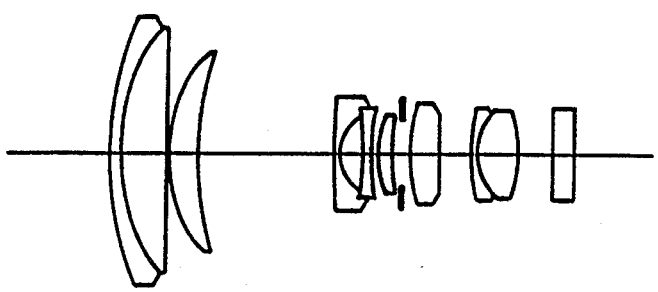
FIG. 2 is a sectional view of a zoom lens of the first embodiment of the present invention.
Figure 3:
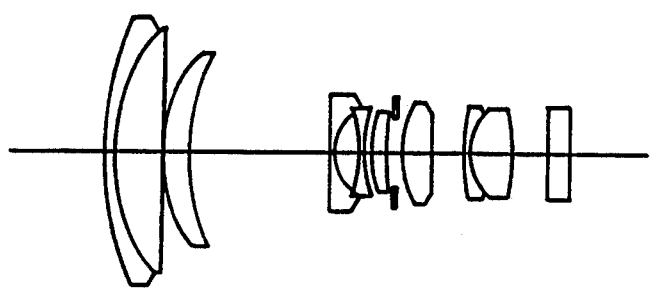
FIG. 3 is a sectional view of a zoom lens of the second embodiment of the present invention.

The above described object is solved by the present invention which provides a wide-angle zoom lens system comprising from the object side to the image side: a first positive lens unit being stationary on an optical axis during a zooming operation; a second negative lens unit shifting along the optical axis during the zooming operation; a third positive lens unit being stationary on the optical axis during the zooming operation; and a fourth positive lens unit shifting along the optical axis during the zooming operation; wherein the zoom lens system fulfills the following conditions:

$$0.155 < \Phi 1 \cdot Z \cdot Y'^3 / fs^2 < 0.355$$

$$0.040 < (\Phi 1 / |\Phi 2|) \cdot (Y'/fs)^3 < 0.065$$

wherein: $\Phi 1$ represents a refractive power of the first lens unit; $\Phi 2$ represents a refractive power of the second lens unit; $Y'$ represents a maximum image height; fs represents the shortest focal length of said zoom lens system; and Z represents a zoom ratio.

To keep a zoom lens small in size in spite of widening of its angle of view, it is necessary to select a lens which has less lens elements and whose aberration quality is lowered very little by widening of the angle of view. Such lens comprises what are described above. However, even if such lens is selected, a zoom lens cannot be kept small in size by simply widening the angle of view.

The condition (1) defines a range of refractive power of the first lens unit. When an angle of view of a lens system is widened, the diameter of a front lens is most influenced. To shorten the diameter of the front lens as much as possible, it is important to consider the refractive power of the first lens unit. When the refractive power of the first lens unit exceeds the maximum of the condition (1), aberration of the first lens unit, especially curvature of field at the wide angle end, occurs much more. As a result, necessary aberration quality can not be satisfied and the diameter of the front lens becomes longer on the contrary. When the refractive power of the first lens unit is under the minimum of the condition (1), the whole length of the lens system becomes longer, so that the diameter of the front lens also becomes longer.

The condition (2) defines a ratio of refractive powers of the first and second lens units. The condition (2) also relates greatly to the diameter of the front lens. When the refractive power of the first lens unit against the second lens unit is over the maximum of the condition (2), the diameter of the front lens becomes remarkably longer. When the refractive power of the first lens unit against the second lens unit is under the minimum of the condition (2), the shifting amount of the fourth lens unit in a zooming operation is increased and the whole length of the lens system becomes longer, so that a small wide-angle zoom lens can not be realized.

The conditions (1) and (2) include each a maximum image height Y', which relates to an angle of view at the wide angle end. The wider the angle of view of a lens becomes, the more difficult aberration correction becomes.

It is desirable that the third or fourth lens unit has at least one aspherical surface.

It is further desirable that the third lens unit fulfills the following condition:

$$-0.23 < R3F/R3R < -0.45 \ (R3F>0) \tag{3}$$

wherein R3F denotes a radius of curvature of a surface located at the object side end of the third lens unit and R3R denotes a radius of curvature of a surface located at the image side end of the third lens unit.

One of the ways for providing a small wide-angle zoom lens is to reduce the number of lens elements by using aspherical surfaces. By reducing the number of lens elements, the whole length can be surely decreased by the total thickness of the reduced lens elements worth of length. When an aspherical surface is used in the third lens unit, the aspherical surface is mainly useful for correcting spherical aberration. In this case, the aberration quality, needless to say, can be high by using the aspherical surface without changing the number of the lens elements. For keeping the aberration quality high in spite of the reducing of the number of the lens elements by using the aspherical surface, a radius of curvature of each surface has to be a proper value. The condition (3) defines the shapes of two surfaces located at the object and image side ends of the third lens unit for correcting the spherical aberration with the aspherical surface most easily. When either the maximum or the minimum of the condition (3) is exceeded, the spherical aberration on the spherical surface can not be corrected sufficiently. Even if an aspherical surface is used for correcting the spherical aberration with the condition (3) unsatisfied, the number of the lens elements can not be reduced.

It is desirable that the fourth lens unit fulfills the following condition:

$$-0.65 < R4F/R4R < -1.20 \ (R4F>0) \tag{4}$$

wherein R4F denotes a radius of curvature of a surface located at the object side end of the third lens unit and R4R denotes a radius of curvature of a surface located at the image side end of the third lens unit.

Differing from the aspherical surface used in the third lens unit, that of the fourth lens unit is mainly useful for correcting curvature of field and coma. If the condition (4) is not fulfilled, the curvature of field and the coma on the spherical surface are corrected insufficiently. Then, it is impossible to reduce the number of the lens elements even if an aspherical surface is used.

It is further desirable that the third lens unit comprises only one positive lens element which has at least one aspherical surface. The third lens unit is stationary during a zooming operation, and the lens-back has to be kept short by the considerably strong refractive power of the third lens unit. Therefore, using a negative lens element in the third lens unit makes the curvature of a positive lens element large. In addition, by using an aspherical surface, a negative lens element is not needed from a point of view of aberration correction. When the above described condition (3) is fulfilled, the third lens unit can be realized, as the simplest structure, only with one positive lens element. Thus, the lens system can be extremely small in size.

When the above mentioned condition (4) is fulfilled, the fourth lens unit can be also realized with the simplest structure. Namely, it is preferable that the fourth lens unit consists of, from the object side to the image side, a negative lens element and a positive lens element having at least one aspherical surface. Compared with the third lens unit, the fourth lens unit has a weak refractive power although the light bundle passing through the lens unit is small, accordingly, the curvature of a positive lens element is not so much large even if a negative lens element is used. Moreover, since the fourth lens unit is required to sufficiently correct the aberration which can not be corrected enough between the first and third lens units, it is desirable to use a negative lens element and an aspherical surface in the fourth lens unit. Then, the simplest aberration correction can be performed with the above described structure.

It is desirable that the first lens unit is stationary in a focusing operation and that the fourth lens unit is capable of shifting along the optical axis for focusing. When a focusing operation is carried out in the first lens unit, in order that the most-off-axial lower light rays should pass under the optical axis at an aperture point, the diameter of the first lens unit is needed to be longer at a point where the first lens unit is shifted. Then, the diameter of the front lens is necessarily required to be long, and it is especially long in the case of a wide-angle lens. The weight of the front lens element is almost half or more of the weight of the lens system, so that when the diameter of the front lens element is lengthened by 10%, the weight of the lens system sometimes increases by 30–40%. To prevent that, it is desirable to perform the focusing operation in the second lens unit or the subsequent units, and the fourth lens unit is the most desirable. By focusing in the fourth lens unit, a driving mechanism can be also used for zooming, and the focusing operation can be possible without lengthening the length of a lens system.

It is further desirable that the first lens unit comprises at least two lens elements including a negative lens element and that the second lens unit comprises at least two lens elements including a positive lens element. Concretely, it is preferable that the first lens unit consists of, from the object side to the image side, a negative lens element concave to the image side, a positive lens element, and a positive meniscus lens element convex to the object side, and that the second lens unit consists of, from the object side to the image side, a negative lens element concave to the image side, a biconcave lens element, and a positive lens element. Aberration of the first and second lens units must be corrected sufficiently in each lens unit so as to reduce aberration change in a zooming operation as possible. Particularly, concerning chromatic aberration, when the aberration is not corrected enough in the first and second lens units, whatever aberration correction is performed in the third and fourth lens units, proper chromatic aberration can not be achieved in any focal lengths except for a certain focal length. Therefore, by using a negative lens element in a lens unit having a positive refractive power and by using a positive lens element in a lens unit having a negative refractive power, the chromatic aberration is corrected sufficiently. Then, the lens elements are arranged as described above, as the most desirable structure.

For providing a small wide-angle zoom lens, it is desirable that the third lens unit is stationary in a zooming operation as described before. However, the third lens unit can shift slightly along the optical axis in order to make aberration correction easy in the zooming operation.

Embodiments of the present invention are described hereinafter. In each embodiment, ri denotes a radius of curvature of the i-th surface from the object side; di denotes the i-th axial distance from the object side; Ni and vi denote a refractive index and an Abbe number to the d line of the i-th lens element from the object side, respectively; and f denotes a focal length of a lens system.

TABLE 1

Embodiment 1
$f = 37.8 - 15.0 - 5.01$   f-number $= 1.65 - 1.71 - 1.64$

| Radius of Curvature | | Axial Distance | | Refractive Index (Nd) | | Abbe number (vd) |
|---|---|---|---|---|---|---|
| $r_1$ | 51.931 | | | | | |
| | | $d_1$ | 1.300 | $N_1$ 1.83350 | $v_1$ | 21.00 |
| $r_2$ | 27.762 | | | | | |
| | | $d_2$ | 6.000 | $N_2$ 1.69680 | $v_2$ | 56.47 |
| $r_3$ | 65919.562 | | | | | |
| | | $d_3$ | 0.100 | | | |
| $r_4$ | 19.858 | | | | | |
| | | $d_4$ | 4.000 | $N_3$ 1.69680 | $v_3$ | 56.47 |
| $r_5$ | 38.819 | | | | | |
| | | $d_5$ | 17.995 - 11.792 - 0.800 | | | |
| $r_6$ | 49.961 | | | | | |
| | | $d_6$ | 0.900 | $N_4$ 1.77250 | $v_4$ | 49.77 |
| $r_7$ | 5.800 | | | | | |
| | | $d_7$ | 3.000 | | | |
| $r_8$ | −31.713 | | | | | |
| | | $d_8$ | 0.900 | $N_5$ 1.77250 | $v_5$ | 49.77 |
| $r_9$ | 18.314 | | | | | |
| | | $d_9$ | 1.000 | | | |
| $r_{10}$ | 12.432 | | | | | |
| | | $d_{10}$ | 2.000 | $N_6$ 1.83350 | $v_6$ | 21.00 |
| $r_{11}$ | 34.860 | | | | | |
| | | $d_{11}$ | 1.200 - 7.403 - 18.395 | | | |
| $r_{12}$ | ∞ | | | | | |
| | | $d_{12}$ | 1.000 | | | |
| $r_{13}$ | 17.340 | | | | | |
| | | $d_{13}$ | 4.000 | $N_7$ 1.69680 | $v_7$ | 56.47 |
| $r_{14}$ | −64.763 | | | | | |
| | | $d_{14}$ | 4.000 - 2.474 - 4.465 | | | |
| $r_{15}$* | 20.147 | | | | | |
| | | $d_{15}$ | 0.900 | $N_8$ 1.83350 | $v_8$ | 21.00 |
| $r_{16}$ | 8.038 | | | | | |
| | | $d_{16}$ | 5.500 | $N_9$ 1.69680 | $v_9$ | 55.47 |
| $r_{17}$ | −18.352 | | | | | |
| | | $d_{17}$ | 4.500 - 6.026 - 4.035 | | | |
| $r_{18}$* | ∞ | | | | | |
| | | $d_{18}$ | 3.000 | $N_{10}$ 1.51680 | $v_{10}$ | 64.20 |
| $r_{19}$ | ∞ | | | | | |

TABLE 2

Embodiment 2
$f = 37.8 - 15.0 - 5.01$   f-number $= 1.63 - 1.68 - 1.64$

| Radius of Curvature | | Axial Distance | | Refractive Index (Nd) | | Abbe number (vd) |
|---|---|---|---|---|---|---|
| $r_1$ | 51.496 | | | | | |
| | | $d_1$ | 1.300 | $N_1$ 1.83350 | $v_1$ | 21.00 |
| $r_2$ | 27.351 | | | | | |
| | | $d_2$ | 6.000 | $N_2$ 1.69680 | $v_2$ | 56.47 |
| $r_3$ | 1061.289 | | | | | |
| | | $d_3$ | 0.100 | | | |
| $r_4$ | 19.369 | | | | | |
| | | $d_4$ | 4.000 | $N_3$ 1.69680 | $v_3$ | 56.47 |
| $r_5$ | 38.074 | | | | | |
| | | $d_5$ | 18.000 - 11.884 - 0.800 | | | |
| $r_6$ | 66.465 | | | | | |
| | | $d_6$ | 0.900 | $N_4$ 1.77250 | $v_4$ | 49.77 |
| $r_7$ | 5.990 | | | | | |
| | | $d_7$ | 3.000 | | | |
| $r_8$ | −33.978 | | | | | |
| | | $d_8$ | 0.900 | $N_5$ 1.77250 | $v_5$ | 49.77 |
| $r_9$ | 18.415 | | | | | |
| | | $d_9$ | 1.000 | | | |
| $r_{10}$ | 12.945 | | | | | |
| | | $d_{10}$ | 2.000 | $N_6$ 1.83350 | $v_6$ | 21.00 |
| $r_{11}$ | 36.556 | | | | | |
| | | $d_{11}$ | 1.200 - 7.316 - 18.401 | | | |
| $r_{12}$ | ∞ | | | | | |
| | | $d_{12}$ | 1.000 | | | |
| $r_{13}$ | 13.902 | | | | | |
| | | $d_{13}$ | 4.000 | $N_7$ 1.69680 | $v_7$ | 56.47 |
| $r_{14}$ | −33.057 | | | | | |

TABLE 2-continued

Embodiment 2
f = 37.8 - 15.0 - 5.01   f-number = 1.63 - 1.68 - 1.64

| Radius of Curvature | | Axial Distance | | Refractive Index (Nd) | | Abbe number (vd) |
|---|---|---|---|---|---|---|
| | | $d_{14}$ | 4.000 - 2.018 - 4.577 | | | |
| $r_{15}$* | 21.315 | | | | | |
| | | $d_{15}$ | 0.900 | $N_8$ | 1.83350 | $v_8$ 21.00 |
| $r_{16}$ | 7.228 | | | | | |
| | | $d_{16}$ | 5.500 | $N_9$ | 1.69680 | $v_9$ 56.47 |
| $r_{17}$ | −28.435 | | | | | |
| | | $d_{17}$ | 4.500 - 6.482 - 3.923 | | | |
| $r_{18}$* | ∞ | | | | | |
| | | $d_{18}$ | 3.000 | $N_{10}$ | 1.51680 | $v_{10}$ 64.20 |
| $r_{19}$ | ∞ | | | | | |

In the embodiments, * denotes an aspherical surface, which is defined as follows:

$$X(h) = \frac{h^2/r}{1 + \{1 - \epsilon \cdot (h/r)^2\}^{\frac{1}{2}}} + \sum_{n=2}^{\infty} A_n h^n$$

[Embodiment 1]

$r_{15}$: ω = 1
 $A_4 = 0.11551 \times 10^{-3}$   $A_6 = 0.72710 \times 10^{-6}$
 $A_8 = 0.20890 \times 10^{-7}$   $A_{10} = 0.57374 \times 10^{-9}$
 $A_{12} = 0.29690 \times 10^{-10}$ $r_{18}$: ω = 1
 $A_4 = 0.19119 \times 10^{-4}$   $A_6 = 0.92844 \times 10^{-5}$
 $A_8 = 0.80487 \times 10^{-6}$   $A_{10} = 0.32741 \times 10^{-7}$
 $A_{12} = 0.51063 \times 10^{-9}$

[Embodiment 2]

$r_{15}$: ω = 1
 $A_4 = 0.14285 \times 10^{-3}$   $A_6 = 0.52758 \times 10^{-6}$
 $A_8 = 0.16514 \times 10^{-7}$   $A_{10} = 0.72413 \times 10^{-9}$
 $A_{12} = 0.28270 \times 10^{-10}$ $r_{18}$: ω = 1
 $A_4 = 0.52919 \times 10^{-5}$   $A_6 = 0.95318 \times 10^{-5}$
 $A_8 = 0.78797 \times 10^{-6}$   $A_{10} = 0.33088 \times 10^{-7}$
 $A_{12} = 0.49885 \times 10^{-9}$ Values of the conditions of the embodiments are described hereinafter.

[Embodiment 1]

Condition (1): 0.26238
Condition (2): 0.04902
Condition (3): −0.2677
Condition (4): −1.0978

[Embodiment 2]

Condition (1): 0.26238
Condition (2): 0.04903
Condition (3): −0.4205
Condition (4): −0.7496

By fulfilling the above described requirements, a zoom lens system which is small in size and has a high zoom ratio in spite of the angle of view, 2ω=60° or more, at the wide-angle end can be provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A wide-angle zoom lens system, comprising from the object side to the image side:

a first positive lens unit being stationary on an optical axis during a zooming operation;

a second negative lens unit shifting along the optical axis during the zooming operation;

a third positive lens unit being stationary on the optical axis during the zooming operation; and a fourth positive lens unit shifting along the optical axis during the zooming operation;

wherein the zoom lens system fulfills the following conditions:

$$0.155 < \Phi1Z \cdot Y'^3/fs^2 < 0.355$$

$$0.040 < (\Phi1/|\Phi2|) \cdot (Y'/fs)^3 < 0.065$$

wherein:

Φ1 represents a refractive power of the first lens unit;

Φ2 represents a refractive power of the second lens unit;

Y' represents a maximum image height;

fs represents the shortest focal length of said zoom lens system; and

Z represents a zoom ratio.

2. A wide-angle zoom lens system as claimed in claim 1, wherein the third or fourth lens units have at least one aspherical surface.

3. A wide-angle zoom lens system as claimed in claim 2, wherein the fourth lens unit fulfills the following condition:

$$-0.65 < R4F/R4R < -1.20 \qquad (R4F<0)$$

wherein:

R4F represents a radius of curvature of a surface located at the object side end of the third lens unit; and R4R represents a radius of curvature of a surface located at the image side end of the third lens unit.

4. A wide-angle zoom lens system as claimed in claim 3, wherein the fourth lens unit includes from the object side to the image side a negative lens element and a positive lens element having at least one aspherical surface.

5. A wide-angle zoom lens system as claimed in claim 1, wherein the third lens unit fulfills the following condition:

$$-0.23 < R3F/R3R < -0.45 \qquad (R3F>0)$$

wherein:

R3F represents a radius of curvature of a surface located at the object side end of the third lens unit; and R3R represents a radius of curvature of a surface located at the image side end of the third lens unit.

6. A wide-angle zoom lens system as claimed in claim 5, wherein the third lens unit is a positive lens element.

7. A wide-angle zoom lens system as claimed in claim 1, wherein the first lens unit is stationary on the optical axis and the fourth lens unit shifts along the optical axis during a focusing operation.

8. A wide-angle zoom lens system as claimed in claim 1, wherein the first lens unit has at least two lens elements including a negative lens element, and the second lens unit has at least two lens elements including a positive lens element.

9. A wide-angle zoom lens system as claimed in claim 8, wherein the first lens unit consists of from the object side to the image side a negative lens element concave to the image side, a positive lens element and a positive meniscus lens element convex to the object side, and the second lens unit consists of from the object side to the image side a negative lens element concave to the image side, a biconcave lens element and a positive lens element.

10. A wide-angle zoom lens system, comprising from the object side to the image side:

a first positive lens unit being stationary on an optical axis during a zooming operation;

a second negative lens unit shifting along the optical axis during the zooming operation;

a third positive lens being stationary on the optical axis during the zooming operation; and a fourth positive lens unit shifting along the optical axis during the zooming operation;

wherein the zoom lens system fulfills the following conditions:

$$0.155 < \Phi 1 \cdot Z \cdot Y'^3 / fs^2 < 0.355$$

$$0.040 < (\Phi 1 / |\Phi 2|) \cdot (Y'/fs)^3 < 0.065$$

$$-0.23 < R3F/R3R < -0.45 \ (R3F > 0)$$

wherein:

$\Phi 1$ represents a refractive power of the first lens unit;

$\Phi 2$ represents a refractive power of the second lens unit;

Y' represents a maximum image height;

fs represents the shortest focal length of said zoom lens system;

Z represents a zoom ratio;

R3F represents a radius of curvature of a surface located at the object side end of the third lens unit; and R3R represents a radius of curvature of a surface located at the image side end of the third lens unit.

11. A wide-angle zoom lens system, comprising, from the object side to the image side:

a first positive lens unit being stationary on an optical axis during a zooming operation;

a second negative lens unit shifting along the optical axis during the zooming operation;

a third positive lens being stationary on the optical axis during the zooming operation; and a fourth positive lens unit shifting along the optical axis during the zooming operation, including a negative lens element and a positive lens element having at least one aspherical surface;

wherein the zoom lens system fulfills the following conditions:

$$0.155 < \Phi 1 \cdot Z \cdot Y'^3 / fs^2 < 0.355$$

$$0.040 < (\Phi 1 / |\Phi 2|) \cdot (Y'/fs)^3 < 0.065$$

wherein:

$\Phi 1$ represents a refractive power of the first lens unit;

$\Phi 2$ represents a refractive power of the second lens unit;

Y' represents a maximum image height;

fs represents the shortest focal length of said zoom lens system; and

Z represents a zoom ratio.

* * * * *